(12) United States Patent
Sherwin

(10) Patent No.: US 6,416,804 B1
(45) Date of Patent: Jul. 9, 2002

(54) METHOD FOR COOKING POULTRY

(76) Inventor: Richard B. Sherwin, 12905 Archer Ave., Lemont, IL (US) 60439

( * ) Notice: Subject to any disclaimer, the term of this patent is extended or adjusted under 35 U.S.C. 154(b) by 0 days.

(21) Appl. No.: 09/894,747

(22) Filed: Jun. 28, 2001

(51) Int. Cl.$^7$ .............................................. A22C 21/00
(52) U.S. Cl. ....................... 426/282; 426/420; 426/523; 426/644
(58) Field of Search ................... 426/282, 132, 426/420, 523, 644; 99/419, 421 H, 427, 442

(56) References Cited

U.S. PATENT DOCUMENTS

| | | |
|---|---|---|
| 1,485,253 A | 2/1924 | Devlin |
| 1,979,501 A | 11/1934 | Stepkin |
| 2,404,166 A | 7/1946 | Danilla |
| 2,835,480 A | 5/1958 | Perez |
| 2,918,561 A | 12/1959 | Perez |
| 3,584,683 A | 6/1971 | Gordon |
| 3,705,974 A * | 12/1972 | Nilsson ...................... 219/222 |
| 3,709,141 A | 1/1973 | Schwartzstein |
| 3,858,029 A * | 12/1974 | Walter ......................... 219/222 |
| 3,899,657 A | 8/1975 | Johnson |
| 3,965,808 A | 6/1976 | Chomette |
| 3,980,010 A | 9/1976 | Collinucci |
| 4,127,060 A | 11/1978 | Curtis |
| 4,194,015 A | 3/1980 | Colato |
| 4,294,168 A | 10/1981 | Redhead |
| 4,301,509 A | 11/1981 | Haase et al. |
| 4,738,192 A | 4/1988 | Odom, Jr. |
| 4,810,856 A | 3/1989 | Jovanovic |
| 5,106,642 A | 4/1992 | Ciofalo |
| 5,301,602 A | 4/1994 | Ryczek |
| 5,586,489 A | 12/1996 | Fraga |
| 5,662,028 A | 9/1997 | Fraga |
| 5,690,980 A | 11/1997 | Fraga |
| 5,893,320 A | 4/1999 | Demaree |
| 5,918,534 A | 7/1999 | Medina |
| 5,981,908 A * | 11/1999 | Mcguire et al. ............ 219/242 |
| 6,265,004 B1 * | 7/2001 | Cagle ......................... 426/523 |

OTHER PUBLICATIONS

"Make Food Safety a Holiday Tradition," CNN Web–site, Nov. 21, 2000, URL:http://www.CNN.com/2000/Food/News/11/21/food safety.
"Food Safety Myths and Facts," Patsy H. MacNeil, NC State University Cooperative Extension Web Site, URL:http://www.ces/state/nc.us/articles/patsy/foodillness.html.
"Foodborne Diseases," Patient's Guide Web Site, URL:http://www3.bc.sypatico.ca/me/patientsguide/food-brn.htm.
"Food Poisoning," UC Davis Wellness Center Web Site UTL:http://wellness.ucdavis.edu/safety$_{13}$info__prevention/ . . . (no space)food__poisoning.htm.
"Stop That Stuffing! The USDA Issues an Early Thanksgiving Health Warning," Carol Sugarman, Washington Post, Aug. 14, 1996; p. E1.

* cited by examiner

*Primary Examiner*—George C. Yeung
(74) *Attorney, Agent, or Firm*—Meroni & Meroni, P.C.; Charles F. Meroni, Jr.

(57) ABSTRACT

A segmented elongate, hollow convection pipe formed with an angled mid portion which extends through the body cavity of stuffed poultry during cooking. The device is provided in plural individual sections of tubing that are serially joined in a nested fashion. Overall length of the device can be grossly adjusted by selecting greater or fewer numbers of sections of tubing to form the device, and finely adjusted by telescopically sliding the sections relative to each other. The angled mid portion may be provided as a fixed angle, or provided as a selectively adjustable angle to accommodate anatomical differences in poultry. Overall cooking time of both the poultry and the stuffing is uniform and reduced as a result of cooking from the inside as well as the outside. A method is provided for using the convection pipe to safely, quickly, and uniformly cook a raw, stuffed poultry.

5 Claims, 3 Drawing Sheets

METHOD FOR COOKING POULTRY

TO WHOM IT MAY CONCERN

BE IT KNOWN that RICHARD B. SHERWIN, a citizen of the United States and a resident of LEMONT, Ill. U.S.A. has invented new and useful improvements in an METHOD FOR COOKING POULTRY and does hereby declare that the following is a full, clear and exactdescription, reference being had to the accompanying drawings and to the numerals of reference marked thereon, which form a part of this specification.

BACKGROUND OF THE INVENTION

Every year, the Centers for Disease Control and Prevention Estimates that 300,000 people in the United States are hospitalized, and 5,000 people, mostly the very young, the elderly and those with compromised immune systems, die from food borne illness. A staggering 76 million people are sickened due to food borne illnesses[1]. These numbers are conservative because millions of mild cases of food borne illnesses which occur in private homes go unreported. The U. S. Public Health Service cited the four most serious bacteria that cause these illnesses are *E. coli,* Salmonella, Listeria monocytogenes and *Campylobacter jejuni*[2]. These bacteria are commonly found in meat, poultry, eggs, and on vegetables.

Food borne illness is also extremely costly; the estimated yearly cost of food borne diseases in this country is $5 to $6 billion in direct medical expenditures and lost productivity, stated in an article in Patients Guide Index[3].

In an article dated Nov. 21, 2000 on CNN.com, Michael Doyle, Director of the Center for Food Safety at the University of Georgia states, "Most poultry contain harmful bacteria. Recent statistics show about 60% of chickens are contaminated with camplobacter and 10% with Salmonella. Turkeys tend to be slightly higher. It's important that we think about fresh poultry containing potentially harmful bacteria[1]."

An estimated 55 percent of food poisoning cases are caused by improper cooking and storage of foods. In poultry production, poultry handlers who do not wash their hands after going to the bathroom and returning to work can contaminate carcasses with *E.coli*. The carcass itself may be contaminated with Salmonella from the intestinal tract of the bird. While these small amounts of bacterial contamination may not be a danger in and of themselves, given the right conditions they can lead to serious illness or death.

It is well known that these harmful bacteria can be eliminated from food products by proper cooking regimens. In the case of poultry, cooking the product until it reaches an internal temperature of 165 degrees F. will kill the bacteria, and the food is considered safe for eating. Unfortunately, the USDA reports that 50% of cooks do not bother with a meat thermometer, which the USDA sees as a critical problem. Cooks who do not use thermometers rely on how the bird looks or use cooking charts on the packaging. These methods can be unreliable because oven temperatures vary so widely. The problem is further compounded by the practice of stuffing poultry prior to cooking it. The combination of poultry and stuffing increases cooking times. Additionally, it is common for home cooks to stuff the turkey using traditional recipes that include ingredients such as clams, oysters, turkey giblets and raw eggs, which carry their own bacteria as well. In an article from the Washington Post, Aug. 14, 1996, the USDA warns cooks not to stuff turkeys[5].

Meat thermometers can be used to verify proper internal cooked temperature. However, when poultry is stuffed, the poultry itself reaches the safe temperature of 165 degrees Farenheit (74 degrees Celsius) long before the stuffing itself. By the time the stuffing has reached 165 degrees F., the meat of the poultry has been overcooked and is less appetizing. Thus, poultry is often removed from the oven when the meat is done, resulting in improperly cooked stuffing. Other factors which contribute to contamination of food with bacteria include the practices of stuffing the turkey the night before, the use of raw meats and/or raw eggs in the stuffing, and improper sanitation methods such as poor hand washing.

A need exists for a device which will allow uniform cooking of the both the poultry product and the stuffing so that both reach the safe cooking temperature of 165 degrees F. at approximately the same time.

1. "Make Food Safety A Holiday Tradition," CNN Web Site, Nov. 21, 2000.
2. "Food Safety Myths and Facts," Patsy H. MacNeill, NC State University Cooperative Extension Web Site.
3. "Foodborne Diseases," Patient's Guide Web Site,.
4. "Food Poisoning", UC Davis Wellness Center Web Site.
5. "Stop That Stuffing! The USDA Issues an Early Thanksgiving Health Warning," Carole Sugarman, *Washington Post,* Aug. 14, 1996; page E1.

SUMMARY OF THE INVENTION

Consumers are aware of the risks of food borne illness when preparing stuffed poultry, yet continue prepare this food in the traditional way. An innovative convection poultry pipe is described, which when used in cooking stuffed poultry, causes the temperature of the stuffing to exceed the temperature of the turkey breast meat by allowing the heat from the oven to be convected through the center of the stuffing. This allows a rapid heating of the interior of the poultry and provides a safer end food product. Overall cooking time of both the poultry and the stuffing is reduced as a result of cooking the turkey from the inside as well as the outside.

The innovative convection poultry pipe is a generally elongate, hollow metal pipe formed with an angled mid portion. The convection poultry pipe extends completely through the body cavity of the poultry so that it extends from both ends of the carcass. It is supported within the body cavity by being surrounded by stuffing. The convection poultry pipe is placed within the cavity so that the angled mid portion is located adjacent to the small opening between the breastbone and back at the neck end of the poultry, and allows the open ends of the convection poultry pipe to lie above the bottom of the pan so that they are clear of stuffing and cooking liquids, assuring proper airflow through the convection poultry pipe.

The convection poultry pipe is provided with several features which allow it to be used on poultry of greatly varying size, from cornish hens to large turkeys. The device is provided in plural individual sections of tubing that are serially fitted together, end to end, in a nested fashion. Overall length of the convection poultry pipe can be grossly adjusted by selecting greater or fewer numbers of sections of tubing to form the device. Since the device is formed of plural individual sections that are fitted together end to end in a nested fashion, the device can be telescopically adjusted to make fine adjustments in desired overall length and positioning of the angled mid portion. The angled mid portion may be provided as a fixed, or rigid, angle, or may be provided as a selectively adjustable angle to accommodate anatomical differences in various poultry products.

A method of cooking stuffed raw poultry is provided which includes placement of a convection poultry pipe within the stuffed body cavity of the raw poultry prior to cooking such that the convection pipe is surrounded by and supported within the body cavity by the stuffing, and then cooking the stuffed poultry with the convection poultry pipe inside.

DETAILED DESCRIPTION

Figure 1:
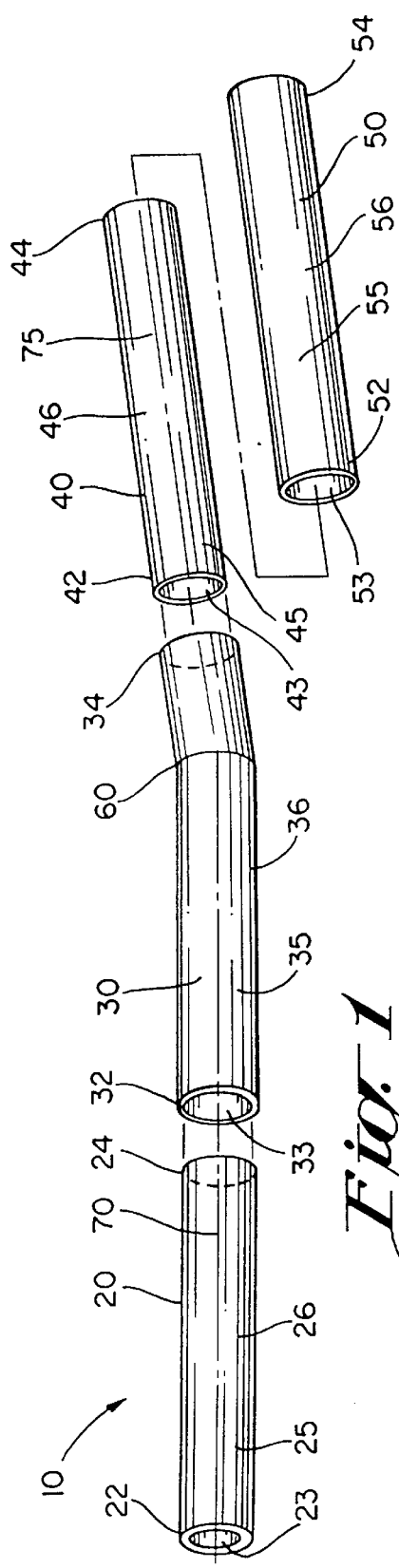
FIG. 1 is an exploded perspective view of the poultry convection pipe.
Figure 2:
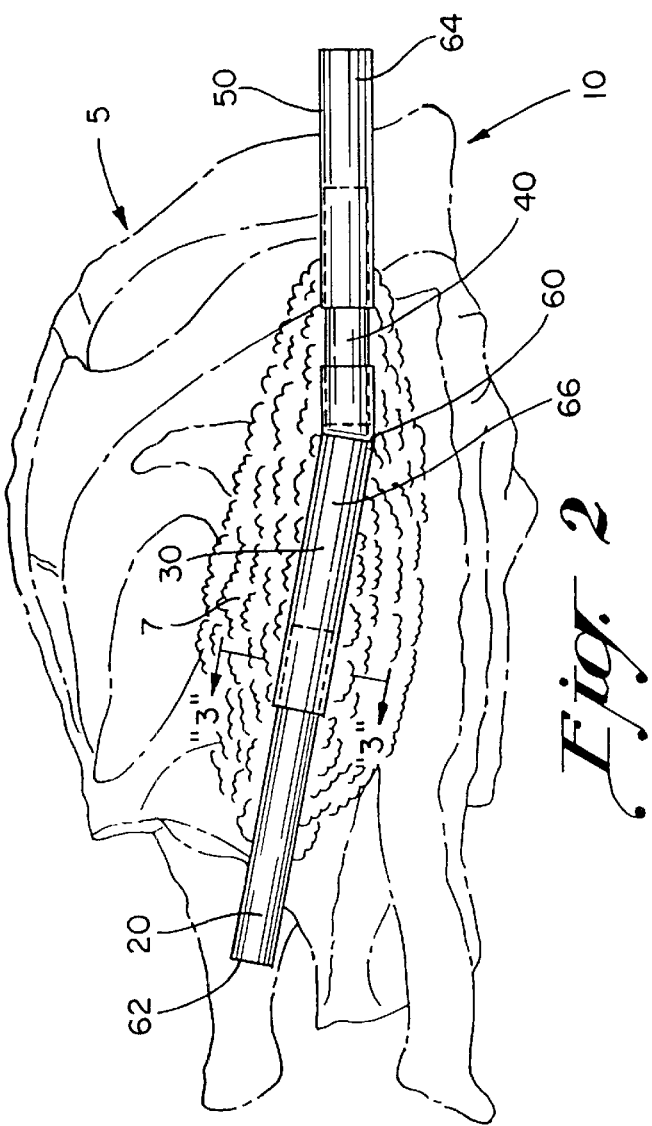
FIG. 2 is a side view of the assembled poultry convection pipe, illustrating its position and orientation within a typical stuffed poultry, the stuffed poultry shown in phantom.
Figure 3:
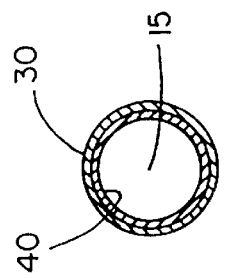
FIG. 3 is a sectional view of the poultry convection pipe across line 3—3 in FIG. 2, illustrating the nested configuration of the telescoping components of the convection pipe.

Referring now to FIGS. 1, 2, and 3, the inventive poultry convection pipe 10 is an elongate hollow tube of generally uniform diameter. Convection pipe 10 is constructed from a plurality of short, individual sections 20, 30, 40, 50 of hollow tube. Each individual section 20, 30, 40, 50 can be separated from the remaining sections, and in use are assembled together in series so as to form a single, elongate tube which is telescopically adjustable. Convection pipe 10 comprises pipe first end 62, pipe second end 64, and pipe mid portion 66 which lies between and separates pipe first end 62 from pipe second end 64.

Pipe first end 62 comprises a first longitudinal axis 70. Pipe second end 64 comprises a second longitudinal axis 75. First longitudinal axis 70 is non-parallel to second longitudinal axis 75, and first longitudinal axis 70 intersects second longitudinal axis 75 in pipe mid portion 66 so as to form angle 60.

In the preferred embodiment, convection pipe 10 is used within a large turkey 5 which has been eviscerated and the body cavity filled with stuffing 7. Convection pipe 10 is supported within the body cavity, and surrounded by, stuffing 7. Convection pipe 10 is provided in a length such that pipe first end 62 extends outside the body cavity adjacent to the tail end of turkey 5, and pipe second end 64 extends outside the body cavity adjacent to the neck end of turkey 5. Preferably, angle 60 is positioned within the body cavity so as to lie adjacent to the neck end, in the narrow opening between the breastbone and back of turkey 5. When properly oriented and supported by stuffing 7, first end 62 of convection pipe 10 lies above both angle 60 and second end 64. Most preferably, second end 64 lies at, or slightly below, the horizontal plane.

In the preferred embodiment, convection pipe 10 comprises at least three short, individual sections 20, 30, 40 of elongate hollow tube of circular cross section, the elongate hollow tube having a circular longitudinal bore such that air flow from the first end to the second end is free and uninterrupted. These three sections comprise a first section 20, a second section 30, and a third section 40. Employment of three individual sections to form convection pipe 10 is excellently suited for use in cooking stuffed duck, chicken, and small to medium sized turkey 6 (see FIG. 5).

First section 20 and third section 40 each are provided with a first outer diameter and a first inner diameter, an open section first end 22, 42, an open section second end 24, 44, a section mid portion 26, 46 which lies between the open section first end 22, 42 and the open section second end 24, 44, an interior surface 23, 43, and an exterior surface 25, 45. Second section 30 is provided with a second outer diameter and a second inner diameter, an open section first end 32, an open section second end 34, a section mid portion 36 which lies between the open section first end 32 and the open section second end 34, an interior surface 33, and an exterior surface 35.

The first outer diameter is slightly less than the second inner diameter, so that when the individual sections 20, 30, 40, are assembled serially together end-to-end, the respective end portions are slidingly fit together in the following manner: Open section second end 24 of first section 20 is nestedly and fittingly received within open section first end 32 of second section 30 such that the exterior surface 25 of first section 20 is confrontingly adjacent to the interior surface 33 of second section 30. Likewise, open section first end 42 of third section 40 is nestedly and fittingly received within open section second end 34 of second section 30 such that the exterior surface 45 of third section 40 is confrontingly adjacent to the interior surface 33 of second section 30. In the preferred embodiment, the differences between the first outer diameter and second inner diameter are small enough to provide a friction fit between the mating sections, so as to maintain the relative position of the sections once assembled. However, the differences between the first outer diameter and second inner diameter are large enough to allow manual adjustment it relative position of the sections. This allows fine adjustment of the length of convection pipe 10, as well as the position of angle 60 within the overall length of convection pipe 10.

In the most preferred embodiment, for use in large turkey 5 (more than thirty pounds), convection pipe 10 comprises four short, individual sections 20, 30, 40, 50 of hollow tube. These four sections comprise first section 20, second section 30, and third section 40 as described above, as well as fourth section 50. Fourth section 50 is provided with the same outer and inner diameters as used with second section 30, that is, the second outer diameter and second inner diameter. It is also provided with an open section first end 52, an open section second end 54, a section mid portion 56 which lies between the open section first end 52 and the open section second end 56 , an interior surface 53, and an exterior surface 55. In use, fourth section 50 may be employed at pipe second end 64 as follows: Open section second end 44 of third section 40 is nestedly and fittingly received within the open section first end 52 of fourth section 50 such that the exterior surface 45 of third section 40 is confrontingly adjacent to the interior surface 53 of fourth section 50 (see FIG. 2).

Figure 5:
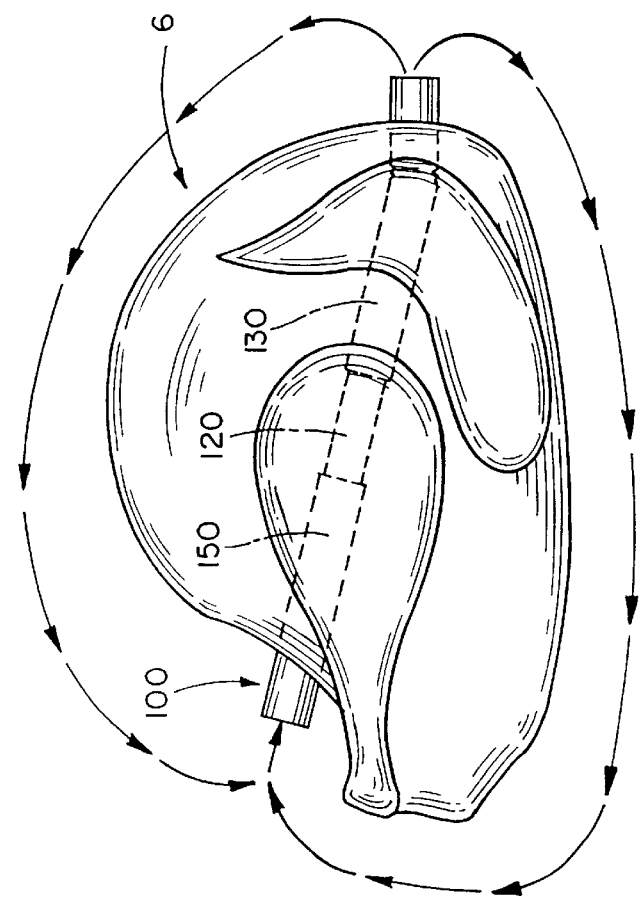
FIG. 5 is a side view of a stuffed poultry showing the poultry convection pipe in phantom and with arrows illustrating the oven heat being convected through the center of the stuffed poultry.

As an alternative configuration, so as to accommodate anatomical differences in various poultry, fourth section 50 may be employed at pipe first end 62 by securing it in series with first section 20 rather than third section 40. As shown in FIG. 5, this alternative configuration is as follows: open section first end 22 of first section 20 (120) is nestedly and fittingly received within the open section second end 54 of fourth section 50 (150) such that the exterior surface 25 of first section 20 (120) is confrontingly adjacent to the interior surface 53 of fourth section 50 (150).

Thus, the over all length of convection pipe 10 may be adjusted in two different ways. Gross adjustment is accomplished by selecting a combination of two, three, or four individual sections to accommodate poultry size. Fine adjustment, and correct placement of angle 60 within turkey 5, is accomplished by telescopic sliding of the individual sections relative to each other.

Preferably, each individual section 20, 30, 40, 50 is provided having an approximate length in the range of 4.5 to 6 inches. In the most preferred embodiment, for use in large turkey 5 (more than thirty pounds), each individual section 20, 30, 40, 50 is provided having an approximate length of 6 inches. Thus, assuming a segment overlap of ¼ inch at the mating end of each segment, the overall convection pipe length is approximately 21 inches. It is, however, well within the scope of the invention to provide each individual section 20, 30, 40, 50 in a length which slightly longer or shorter, so as to accommodate variations in poultry size.

Convection pipe 10 is preferably formed of a light gauge tinned sheet metal, and is provided with an outer diameter which is generally in the range of in the range of ⅝ inch to ¾ inch. This range is suitable for use in large stuffed poultry, such as a turkey. However, it is well within the scope of this invention to provide a convection pipe 10 which has a much smaller general outer diameter so as to accommodate much smaller poultry, such as cornish hen or fryer chicken. It is also well within the scope of this invention to provide a convection pipe 10 which is formed from alternative materials when those materials can provide heat transfer properties which are similar to metal.

Figure 6:
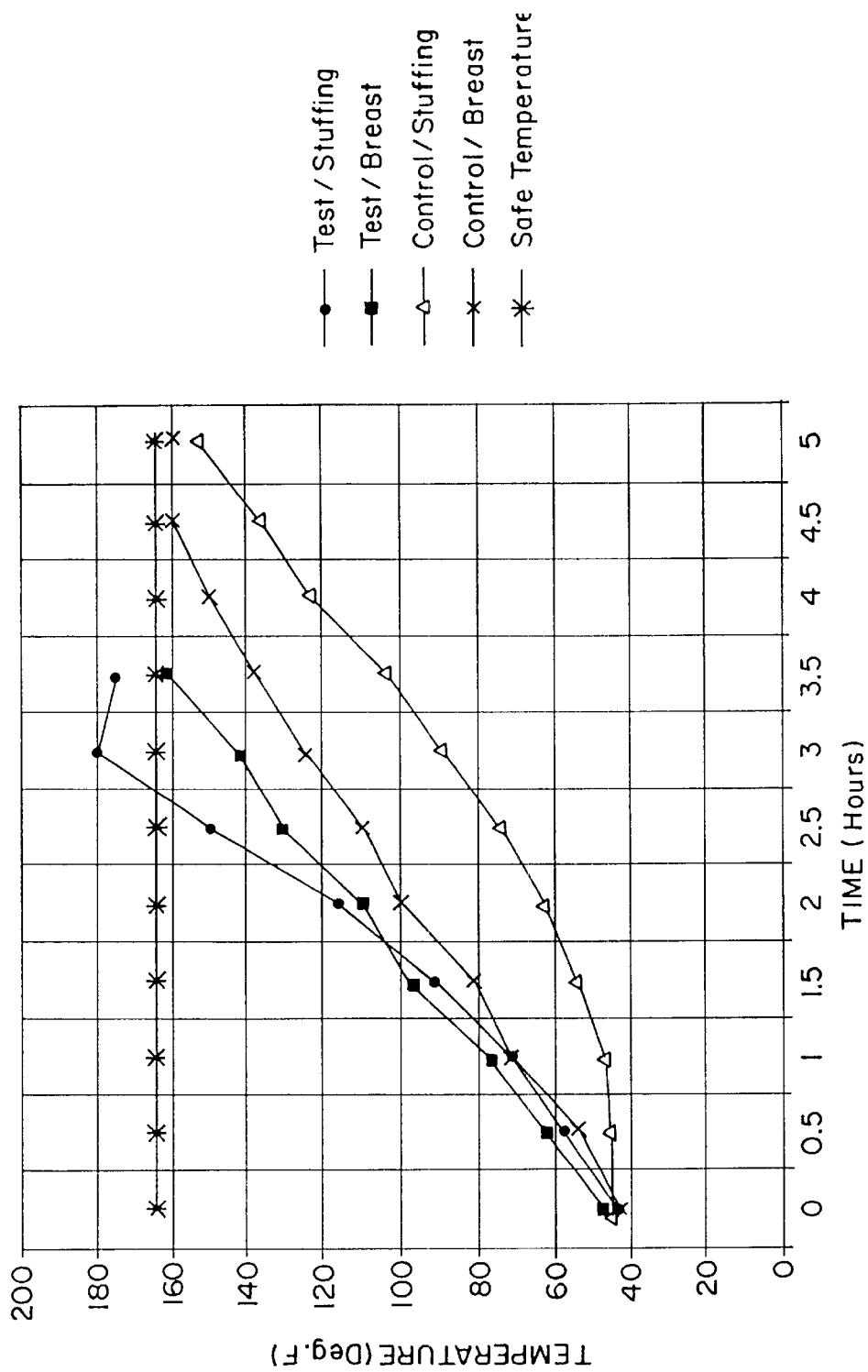
FIG. 6 is a chart which illustrates both the faster time to safe eating temperature of both the breast meat and the stuffing of the stuffed poultry cooked using the poultry convection pipe (test) compared to the stuffed poultry cooked without the poultry convection pipe (control), and the improved overall uniformity of interior temperature of the test poultry compared to the nonuniformity of the control poultry.

In the preferred embodiment, convection pipe 10 is provided having at least a ⅝ inch diameter so as to ensure unrestricted airflow through the stuffed poultry during cooking. This convective airflow, shown using arrows in FIG. 5, allows the stuffing and interior of the poultry to cook at approximately the same rate as its exterior. FIG. 6 is a chart which illustrates the improvement in overall cooking rate, as well as uniformity of cooking rate between the internal (stuffing) and exterior (breast meat) temperatures over time, when poultry is cooked using the innovative convection pipe 10. Thus, both the breast meat and stuffing reached a safe cooking temperature at approximately the same time, and much sooner than a stuffed poultry which was cooked without the inventive device.

As illustrated in FIGS. 1 and 2, angle 60 is preferably provided as rigid and nonadjustable such that first longitudinal axis 70 intersects second longitudinal axis at a fixed angle. This angle is preferably selected from a range of angles, the range of angles being 15 to 30 degrees. In the most preferred embodiment, angle 60 is provided as 22.5 degrees.

Figure 4:
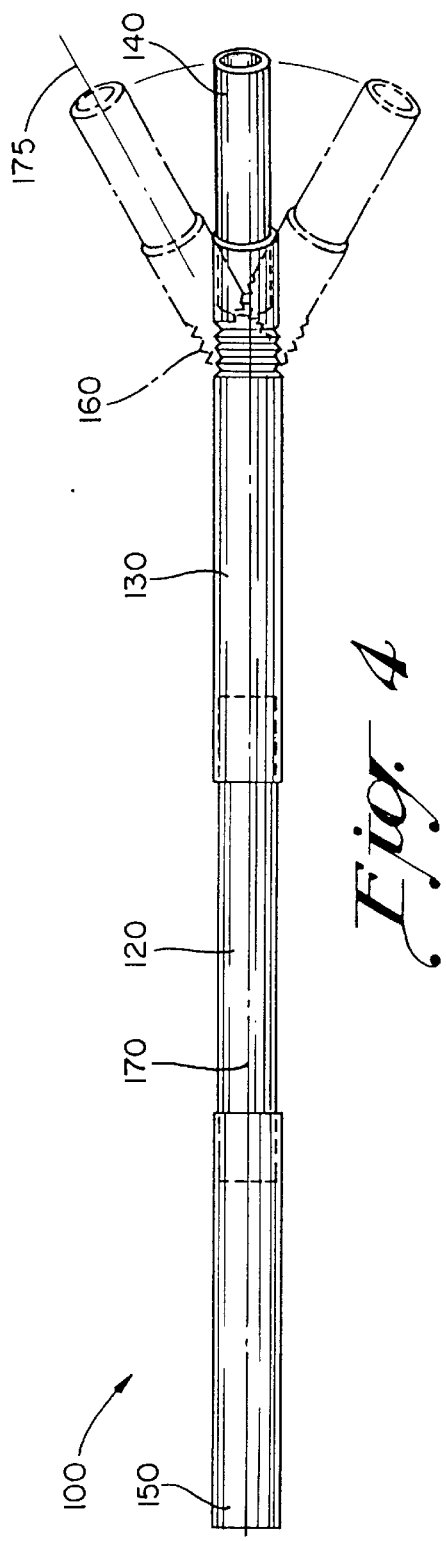
FIG. 4 is a side view of a second embodiment of the poultry convection pipe illustrating an adjustment means within the angled portion which is selectively adjustable through a range of angles.

An alternative embodiment is illustrated in FIGS. 4 and 5. These figures illustrate convection pipe 100 comprising a selective angle adjustment means 160 such that the first longitudinal axis 170 intersects the second longitudinal axis 175 at an angle which is selected by the user from a range of angles, the range of angles comprising 15 degrees to 30 degrees. The angle adjustment means comprises a plurality of selectively expandable and compressible circumferential pleats formed in the tube wall within the angled portion. The pleats are provided with sufficient stiffness so as to maintain the selected angle once so configured. Selective angle adjustment means 160 allow the user to configure convection pipe 100 such that it lies in the proper orientation within the body cavity of the poultry, allowing the user to compensate for anatomical differences in various poultry.

A method for using the convection pipe 10, 100 to quickly and uniformly cook an eviscerated and stuffed raw poultry 5 is now detailed in the following method steps:

1. Thoroughly wash the eviscerated body cavity and exterior of a poultry 5, and season as desired.
2. Based on the overall size of poultry 5, determine the minimum number of individual sections 20, 30, 40, 50 required to form a convection pipe which extends completely through the body cavity of poultry 5, allowing approximately 1 inch of convection pipe to extend beyond both of the respective neck and tail ends of poultry 5 (FIGS. 2 and 5).
3. Insert the convection pipe 10, 100 within the body cavity of poultry 5 and adjust the overall length of the convection pipe 10, 100, and the positions of each of the individual sections 20, 30, 40, 50 of hollow elongate tube relative to the remaining sections and to poultry 5, by applying a longitudinal pressure, in the appropriate direction, on each of the individual sections of hollow elongate tube, such that
   A. the first end 62 of the convection pipe 10, 100 extends out of the tail end of poultry 5 such that the open first end 62 of the convection pipe 10, 100 is spaced apart from the tail end of poultry 5,
   B. the second end 64 of the convection pipe 10, 100 extends out of the neck end of poultry 5 such that the open second end 64 is spaced apart from the neck end of poultry 5, and
   C. the angled portion 60, 160 of the convection pipe 10, 100 resides within the body cavity of poultry 5 such that angled portion 60, 160 lies adjacent to the neck end, and lies within the narrow opening between the breastbone and back of poultry 5.
4. Adjust the angled portion 60, 160 such that the first end 62 of the convection pipe 10, 100 lies above both the angled portion 60, 160 and the second end 64, and the second end 64 lies at, or slightly below, the horizontal plane by applying a transverse pressure to each respective first 62 and second 64 ends of the convection pipe 10, 100.
5. Fill the body cavity with edible stuffing material 7 such that the convection pipe 10, 100 is surrounded by and supported within the body cavity by the edible stuffing material 7, and so that the edible stuffing material 7 maintains convection pipe 10, 100 in the desired orientation.
6. Cook poultry 5 until the internal temperature of the edible stuffing material 7, poultry breast, and poultry thigh are each 165 degrees F. Use of convection pipe 10, 100 provides convective airflow through poultry 5 and its stuffing 7, shown using arrows in FIG. 5. This convective airflow allows the stuffing and interior of the poultry to cook at approximately the same rate as its exterior. As shown in FIG. 6, poultry cooked using convection pipe 10, 100 reach 165 degrees F. in a shorter time, and in a uniform manner so that the poultry meat and stuffing reach the safe temperature at approximately the same time.

While changes may be made in the detail construction and in the method of implementation within the skill of those knowlegeable in the art, it shall be understood that such changes shall be within the spirit and scope of the present invention, as defined by the appended claims.

I claim:

1. A method for quick and uniform cooking of eviscerated and stuffed raw poultry using a convection pipe, the convection pipe comprising an elongate hollow tube of circular cross section, an open first end, and open second end, a mid portion that lies between and separates the first end from the second end, said elongate hollow tube having a circular longitudinal bore of uniform diameter such that air flow from the first end to the second end is free and uninterrupted, the convection pipe further comprising an angled portion residing within its mid portion such that its first end is not coaxial with its second end, the method comprising the following method steps:
1. thoroughly washing the eviscerated body cavity and exterior of a poultry,
2. inserting the convection pipe within the body cavity of the poultry such that
   A. the first end of the convection pipe extends out of the tail end of the poultry such that the open first end of the convection pipe is spaced apart from the tail end of the poultry,
   B. the second end of the convection pipe extends out of the neck end of the poultry such that the open second end is spaced apart from the neck end of the poultry,
   C. the angled portion of the convection pipe resides within the body cavity of the poultry such that the angled portion lies adjacent to the neck end, and lies within a narrow opening between the breastbone and back of the poultry,
3. filling the body cavity with edible stuffing material such that the convection pipe is surrounded by and supported within the body cavity by the edible stuffing material, and
4. cooking the poultry until the internal temperature of the edible stuffing material, poultry breast, and poultry thigh reach about 165 degrees F.

2. The method for quick and uniform cooking of eviscerated and stuffed raw poultry of claim 1 wherein the convection pipe further comprises four individual sections of hollow elongate tube which are joined serially, end to end, so as to form said convection pipe, and wherein the following method step is included after step 1:

1A. based on the overall size of the poultry, determining the minimum number of individual sections are required to form a convection pipe which extends completely through the body cavity of the poultry, allowing approximately 1 inch of convection pipe to extend beyond both of the respective neck and tail ends of the poultry.

3. The method for quick and uniform cooking of eviscerated and stuffed raw poultry of claim 2 wherein based on the overall size of the poultry, three individual sections of hollow elongate tube are required to provide the convection pipe in the appropriate length, and thus only three individual sections are used to cook said poultry, and wherein the said three individual sections comprise a first section, a second section, and a third section, said first section and said third section each comprising a first outer diameter and a first inner diameter, an open first end, an open second end, a mid portion which lies between the open first end and the open second end, an interior surface, and an exterior surface, said second section comprising a second outer diameter and a second inner diameter, an open first end, an open second end, a mid portion which lies between the open first end and the open second end, an interior surface, and an exterior surface, wherein said first outer diameter is less than said second inner diameter, wherein said second end of said first section is nestedly and fittingly received within the first end of said second section such that the exterior surface of said first section is confrontingly adjacent to the interior surface of said second section, wherein the first end of the third section is nestedly and fittingly received within the second end of the second section such that the exterior surface of said third section is confrontingly adjacent to the interior surface of the second section, wherein employment of said three sections of hollow elongate tube provides a means of adjusting the overall length of the convection pipe by changing the amount of overlap between said first section and said second section, and between said second section and said third section, wherein the following method step is included in the method step 2:
adjusting the overall length of the convection pipe, and the positions of each of the three individual sections of hollow elongate tube relative to each other and to the poultry, by applying a longitudinal pressure, in an appropriate direction, on each of the three individual sections of hollow elongate tube.

4. The method for quick and uniform cooking of eviscerated and stuffed raw poultry of claim 3 wherein the first end of the second section comprises a first longitudinal axis, the second end of the second section comprises a second longitudinal axis, wherein said first longitudinal axis is non-parallel to the second longitudinal axis, and wherein said first longitudinal axis intersects the second longitudinal axis so as to form said angled portion, the angled portion residing within the mid portion of the second section.

5. The method for quick and uniform cooking of eviscerated and stuffed raw poultry of claim 4 wherein the angled portion comprises a selective angle adjustment means such that said first longitudinal axis intersects the second longitudinal axis at an angle selected from a range of angles, the range of angles comprising 15 degrees to 30 degrees, wherein the selective angle adjustment means comprises a plurality of selectively expandable and compressible circumferential pleats formed in the tube wall within the angled portion, and wherein the following method step is included after method step 2:
applying a transverse pressure to each respective first and second end of the convection pipe so as to selectively adjust the first end of the convection pipe so that it lies above both the angled portion and the second end, and the second end lies at, or slightly below, the horizontal plane when the convection pipe resides within the body cavity of the poultry.

* * * * *